(12) United States Patent
Zhou et al.

(10) Patent No.: US 8,555,323 B2
(45) Date of Patent: Oct. 8, 2013

(54) METHODS FOR REPLICATING MEDIA CONTENTS AND P2P VOD SYSTEMS

(75) Inventors: Yipeng Zhou, Hong Kong (CN); Zhengjia Fu, Hong Kong (CN); Dah Ming Chiu, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 340 days.

(21) Appl. No.: 12/892,806

(22) Filed: Sep. 28, 2010

(65) Prior Publication Data
US 2012/0079543 A1 Mar. 29, 2012

(51) Int. Cl.
*H04N 7/173* (2011.01)
(52) U.S. Cl.
USPC .............................................. 725/87; 725/86
(58) Field of Classification Search
USPC .......................................................... 725/86, 87
See application file for complete search history.

(56) References Cited

U.S. PATENT DOCUMENTS

| | | | |
|---|---|---|---|
| 2003/0204856 A1 | 10/2003 | Buxton | |
| 2005/0055718 A1 | 3/2005 | Stone | |
| 2007/0208748 A1* | 9/2007 | Li | 707/10 |
| 2007/0250880 A1 | 10/2007 | Hainline | |
| 2008/0049619 A1* | 2/2008 | Twiss | 370/236 |
| 2008/0133767 A1* | 6/2008 | Birrer et al. | 709/231 |
| 2010/0058405 A1 | 3/2010 | Ramakrishnan et al. | |
| 2010/0306339 A1* | 12/2010 | Ling et al. | 709/213 |

OTHER PUBLICATIONS

Cohen, Edith et al., Replication strategies in unstructured peer-to-peer networks, pp. 1-14.
Huang, Y. et al., Challenges, design and analysis of a large-scale P2P-VoD system, pp. 375-388.
Kangasharju, Jussi et al., Optimizing file availability in peer-to-peer content distribution, pp. 1-9.
Laoutaris, Nikolaos et al., ECHOS: Edge capacity hosting overlays of nano data centers, pp. 1-4.
Tewari, Saurabh et al., Proportional replication in peer-to-peer networks, pp. 1-12.
Wu, Jiahua et al., Keep cache replacement simple in peer-assisted VoD systems, pp. 1-5.
Zhang, X. et al., CoolStreaming/DONet: A data-driven overlay network for efficient live media streaming, pp. 1-14.

* cited by examiner

*Primary Examiner* — Nasser Goodarzi
*Assistant Examiner* — Hyun Hong
(74) *Attorney, Agent, or Firm* — Knobbe, Martens, Olson & Bear, LLP

(57) ABSTRACT

There is disclosed a method for replicating media contents in a P2P VoD system comprising a plurality of peers. The method may comprise: determining that a candidate media unit shall be replicated into a local storage of one of the peers; checking whether said local storage has enough space to store the candidate media unit; if not, selecting one media unit previously stored in said local storage to be replaced; and replacing the selected media unit by the candidate media unit.

36 Claims, 4 Drawing Sheets

METHODS FOR REPLICATING MEDIA CONTENTS AND P2P VOD SYSTEMS

TECHNICAL FIELD

The present application relates to a method for replicating media contents in a Peer-to-Peer (P2P) video-on-demand (VoD) system and a P2P VoD system. The present application further relates to a tracker server and a client terminal that may be deployed in the P2P VoD system.

BACKGROUND

Traditional VoD is based on a client-server approach, which is expensive and not scalable. In recent years, the P2P approach was first demonstrated to work for a live content streaming, and later for a VoD streaming as well. Various efforts are working on building a P2P-based VoD platform, for example using set-top boxes (STBs).

The VoD streaming is definitely harder to be accomplished than the live content streaming, since peers are less likely to have the same contents to share with each other. The lack of synchrony (in VoD) is compensated by following two remedial features in P2P VoD systems: a) each peer contributes more storage to replicate the VoD contents; and b) each peer is capable of uploading the contents different from what is currently consumed (downloaded) locally. The effectiveness of this remedy depends on whether the right mix of the media contents is placed at different peers, which is the P2P replication problem at hand. The P2P replication is a central design issue in the P2P VoD systems.

The problem formulation is based on a requirement on more contemporary P2P VoD systems, where the majority of the peers expect to be streaming the contents for immediate viewing. In such systems, video servers must still be deployed to ensure the service quality. A P2P network may be viewed as a mechanism used to off-load the video servers. The objective is to minimize the server bandwidth while peers' viewing quality is ensured. The streaming requirement means there needs to be a balance between the total supply of uplink bandwidth (that is the sum of server(s) and peers' uplink bandwidth) and the total demand (that is the number of viewing peers multiplied by the video playback rate). In practice, the operating regime of particular interest is when the total peer uplink bandwidth is comparable to the demand (of viewing bandwidth). In this regime, ideally the server bandwidth may be zero, if the viewing demand is deterministically known, and all the peers are replicated with the right mix of the contents so as to make full use of their upload capacities. In reality, the impredicability of user demand, and thus the imperfection content replication and service load balancing will always result in some server load.

In addition, traditional VoD systems purely rely on servers to stream video content to clients, which does not scale. In recent years, P2P VoD has been proven to be practical and effective. In P2P VoD system, each peer (or a STB) contributes some storage to store video (or segments of video) content to help the video server. The present application refers to such content replications for P2P VoD applications that help the peers to make an optimal replication decision, i.e. to decide what contents should be replicated locally, so that their upload capacity can be utilized as much as possible under dynamic movie access rate/popularity conditions.

SUMMARY OF THE INVENTION

This invention is about a content replication algorithm for supporting peer-to-peer assisted VoD systems and it is designed to work in a distributed way.

One of the goals of the content replications as claimed in the application is to do the load balance among all the existing peers. For a media unit like a movie with certain media access rate/popularity, if there are too many replication copies of this media unit in peers' local storages, the aggregated service rate for this media unit contributed by peers may exceed the total demand (required service rate), hence wasting of the peers' upload bandwidth; On the other hand, if the number of replication copy is too small, then the total required service rate cannot be satisfied by peers' uploading only, hence consuming the content server's upload bandwidth and computing resources. Therefore, how to achieve the optimal number of replication copies for each media unit so as to maximize a utilization of peers' upload bandwidth (load balance among all the peers) is an essential issue.

To this end, in one aspect, there is provided a method for replicating media contents in a P2P VoD system comprising a plurality of peers, comprising:

determining that a candidate media unit shall be replicated into a local storage of one of the peers;

checking whether said local storage has enough space to store the candidate media unit;

if not, selecting one media unit previously stored in said local storage to be replaced; and replacing the selected media unit by the candidate media unit.

According to another aspect of the application, there is provided a P2P VoD system comprising:

a plurality of peers; and an information collector communicating with each of the peers and configured to determine that a candidate media unit shall be replicated into a local storage of one of the peers;

wherein said one of the peers operates to check whether said local storage has enough space to store the determined candidate media unit; if not, further to select one media unit previously stored in said local storage, and replace the selected media unit by the determined candidate media unit.

In addition, there is provided a tracker server communicating with a plurality of the client terminals. The tracker server may comprise:

a candidate media determining module configured to determine a candidate media unit to be replicated into one or more of the client terminals;

a maintaining module configured to maintain information for a media unit set locally stored in each of the peers, an expected aggregate service rate for the candidate media unit, and a required playback rate for the candidate media unit; and an updating module configured to update the information for said media unit set and the candidate media unit.

There is further provided a client peer, which may comprise:

a retrieving unit configured to at least retrieve an expected aggregate service rate and a required playback rate for a candidate media unit to be replicated into the client peer;

a first comparing unit configured to determine whether the expected aggregate service rate is not lager than the retrieved required playback rate;

a storage volume determining unit configured to determine whether said peer has enough storages for storing the candidate media unit if the retrieved expected aggregate service rate is not lager than the retrieved required playback rate; and a replacing unit configured to store the candidate media unit in said peer if said peer has enough storages for storing the candidate media unit.

The application further provides a method for replicating media contents in a P2P VoD system comprising a plurality of peers. The method may comprise:

determining an expected aggregate service rate of a candidate media unit shall be replicated into a local storage of one of the peers;

determining a required playback rate of the candidate media unit;

determining the expected aggregate service rate is not larger than the required playback rate; and storing the candidate media unit into said local storage.

DETAILED DESCRIPTION

Embodiments of the present application will be described with reference to the accompanying drawings. It should be appreciated that the drawings are present only for purpose of illustration and are not intended to limit the present invention.

Figure 1:
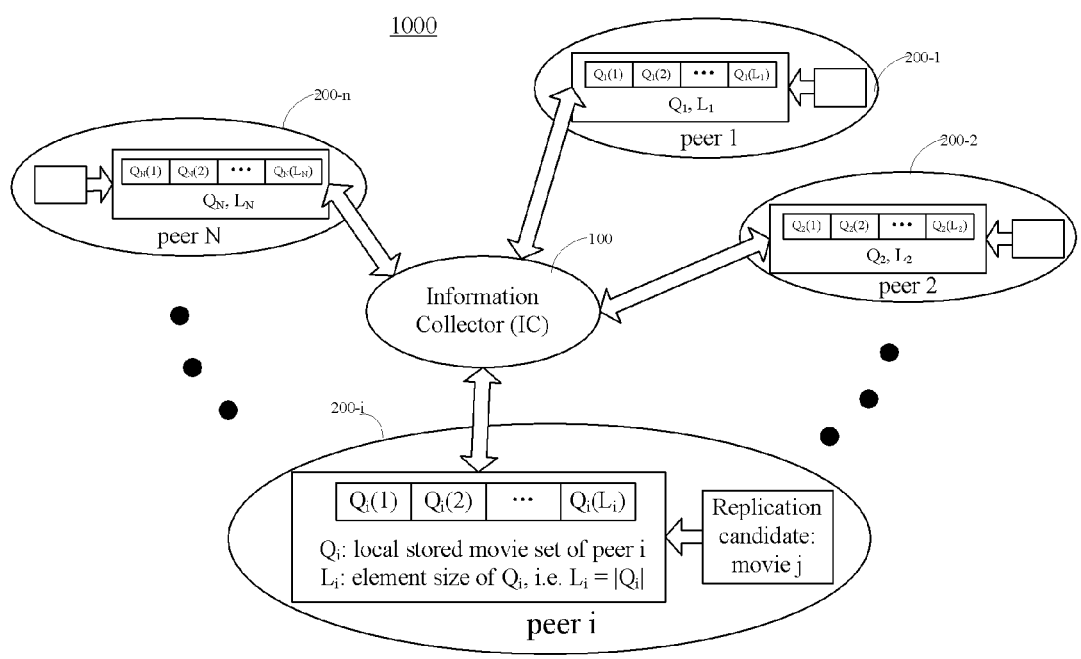
FIG. 1 illustrates a block diagram of a content replication system according to one embodiment of the application.

FIG. 1 shows a block diagram of a content replication system 1000 according to one embodiment of the application. As shown, the system 1000 comprises an information collector 100 and a plurality of peers 200-1, 200-2, ..., 200-i ... 200-n.

1. Information Collector 100

As shown in FIG. 1, the role and function of information collector 100 is actually quite similar to a tracker server, which is widely deployed in the existing P2P file downloading (e.g. BitTorrent, EMule) and P2P live/VoD streaming (e.g. PPLive and PPStream).

The information collector 100 is configured to communicate with each of the peers 200-1, 200-2, ..., 200-i ... 200-n, and maintain useful information of related media units (for example, movies), i.e. media unit j and all the media units in a media unit set $Q_i$ (i=1, ..., N, where N represents the total number of peers in the system) locally stored in each of the peers.

Figure 2:
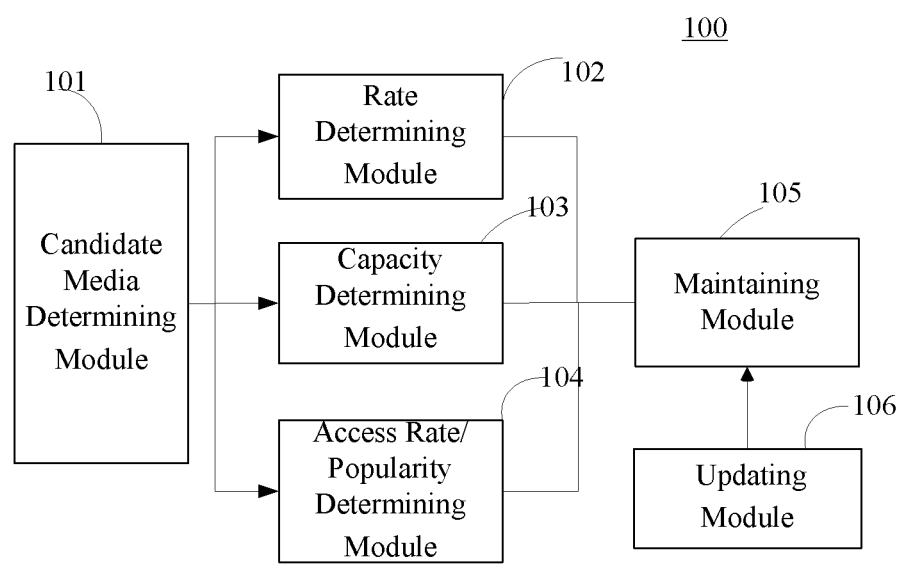
FIG. 2 illustrates a block diagram of an information collector according to one embodiment of the application.

FIG. 2 illustrates a block diagram of the information collector 100. As shown in FIG. 2, the information collector 100 comprises: a candidate media determining module 101, a rate determining module 102, a capacity determining module 103, an access rate/popularity determining module 104, a maintaining determining module 105 and an updating module 106.

The candidate media determining module 101 is configured to determine the candidate media unit j to be replicated into one or more of the peers 200-1, 200-2, ..., 200-i ... 200-n. The media unit used in the application may comprise any minimum logical unit for replacement and replication of the media contents. In one embodiment, the media unit may be a movie as the minimum logical unit. In real implementation, the minimum logical unit may be in smaller size, i.e. block/chunk based. Usually a movie can be composed of tens to hundreds of chunks (depending on sizes of chunk used).

The candidate media unit j to be replicated into peer's local storage may be determined by one of the following ways.

1) Depend on peers' viewing behavior.

In this case, all the media units (for example, movies) to be or has been replicated are fully related to the peers' viewing behaviors. A media unit, to be the candidate for being replicated by a peer, must be requested by this peer before, (i.e., to be or has been watched by this peer). In other words, those media units that the peer is not interested in or has not ever requested cannot become a replicating candidate media unit for this peer.

2) Assigned by service provider or administrator.

In this case, all the media units to be replicated or has been replicated in peers' local storage are completely irrelative to what peers are watching or have watched. Under certain situations, this mode needs coloration with the method of assigning a request rate/popularity for the candidate media unit $\eta_j$ (in manually assigning mode). For example, when the service provider or administrator predicts that media unit k will become very hot in a short time and currently expected aggregate service rate $ASR_k$ for the media unit k is not large enough. By manually assigning a larger $\eta_k$ and assigning the media unit k as the replication candidate media unit to certain amount of peers, the replicas of the media unit k can be quickly increased, as well as the $ASR_k$. The request rate/popularity $\eta_j$ for the candidate media unit and expected aggregate service rate $ASR_k$ will be discussed latter.

3) Mixture of methods 1) and 2)

This mode is most practical and preferred because it has the advantages of both methods.

Advantage of method 1): the replication candidate media unit is related to peer's viewing behavior, i.e., in some extent, reflecting the media unit access rate/popularity of this media unit (assuming that peers share some common interests in the media unit.)

Advantage of method (2): manual or administrative control could help on some special cases. For example, a new media unit (such as, a new movie) would become very hot in a short time; or a cold media unit (such as, a cold movie) would suddenly become hot again; or an old media unit will not be served any more.

And then, the service rate determining module 102 operates to determine a required playback rate $PBR_j$ for a candidate media unit j for each of the peers 200-1, 200-2, ..., 200-i ... 200-n, and an expected aggregated service rate $ASR_j$ for the candidate media unit j, respectively. The $PBR_j$ may be predetermined and media dependant. The $ASR_j$ is provided by the peers. The calculation for the expected aggregated service rate for media units will be discussed latter.

In one embodiment, the capacity determining module 103 operates to determine a upload capacity $U_i$ of each of the peers 200-1, 200-2, ..., 200-i ... 200-n, and the access rate/popularity determining module 104 operates to determine an access rate/popularity $\eta_i$, of each of the media units. Alternatively, each of the peers 200-1, 200-2, ..., 200-i ... 200-n may determine the upload capacity for respective peer and the access rate/popularity for each of the media units, and then send the determined information to the information collector 100. In this case, the modules 103 and 104 are not necessary and may be removed.

The maintaining module 105 is unitized to maintain the information for a media unit set $Q_i(Q_i, i=1, ..., N$, where N represents the total number of peers in the system) locally stored in each of the peers, and the information for the candidate media unit j, such as the above mentioned $ASR_j$ and $PBR_j$. The updating module 106 operates to update the information maintained in the maintaining module 105.

In summary, the information that is maintained in the maintaining module 105 is further discussed as below.

1) Total number of peers in the system (N)

In dynamic scenario, such as P2P live/VoD streaming system, peer churn will cause N changing with time rapidly. To release this fast changing factor, measurement methods like periodic updating, time-based averaging, etc, can be applied to release the factor, whereas in static scenario, such as IPTV (set-top boxes), peer churn will be very small.

2) The local stored media unit set of each peer ($Q_i$, i=1, ..., N)

This information $Q_i$ (media ID, media size, etc) will be updated only when peers send update message, for example, after the replacement, or local storage change. According to one embodiment, each peer i may obtain its own a locally and then report the same to the information collector 100. Alternatively, $Q_i$ may be determined by the information collector 100. In this case, the information collector 100 may further comprises a corresponding module (not shown) to determine $Q_i$.

3) The access rate/popularity for each media unit ($\eta_k$, k∈K, the total media set in each peer)

$\eta_k$ is a very important parameter when making the decision of replacement, therefore affects the system performance (server load or burden). There are at least three ways to determine $\eta_{7k}$ in real implementation.

In one implementation, $\eta_k$ is determined by directly applying the historical data, i.e., the measurement results of the access rate of the media unit k in the past. Here we illustrate an example of measuring the access rate of the media unit k during the past one day.

We denote $V_k(T)$ to be the number of times that the media unit k has been viewed by peers in the past time duration T (here T=1 day) and the total number of viewing behaviors $V(T)=\Sigma_{k \in K} V_k(T)$. Therefore, the predicted $\eta_k(T+1)=V_k(T)/V(T)$, a real number between 0 and 1.

This method is very simple and easy to implement. In addition, it costs minimal computing and memory resources. But, because the media unit popularity will change (may change rapidly), some media units like movies become hot (popular) in a short time while some of the movies are gradually becoming cold (unpopular), the draw back of this method is that it cannot catch the changing trend of movie popularity, especially those movies that are continuously becoming hotter or colder.

In the other implementation, $\eta_k$ may be determined by applying the prediction result on the historical data. This method is designed for catching the changing trend of media unit popularity. The history measuring results are still important. For example, if given $V_k(1)$, $V_k(2)$, $V_k(3)$, three days' access rates of the media unit k, the $V_k(4)$ can be a regression of the $V_k(1)$, $V_k(2)$ and $V_k(3)$, either linear or 2nd order-polynomial, and V(4) can be predicted in a similar way. Hence, the predicted $\eta_k(4)=V_k(4)/V(4)$.

In addition, $\eta_k$ may be manually assigned by a service provider or administrator. In order to make $\eta_k$ more accurate, manually assigning value of $\eta_k$ is also a useful way. For example, when service provider want to stop providing viewing service for the media unit k, they can easily achieve this purpose by assigning $\eta_k=0$. According to our algorithm, the replicas of the media unit k in peers' local storage will automatically get removed whenever there appears a candidate the media unit to be replicated.

4) The upload capacity of each peer, ($U_i$, i=1, ..., N)

This information is provided by peers. Since network conditions are various with time, peers can slowly update their measured upload capacity. However, this parameter can also be assigned manually by service provider or administrator when the whole system is in a controlled environment, like some IPTV system.

5) The expected aggregate service rate for each media unit ($ASR_k$, k∈K)

As long as there are updates of peers' local stored the media unit set, the information collector needs to re-calculate $ASR_k$ accordingly. In one embodiment, $ASR_k$ may be determined by each of the peers and then be reported to the information collector.

6) The required playback rate for each media unit ($PBR_k$, k∈K)

$PBR_k$ is media unit dependant and decided mainly by audio/video codec, but it can be easily obtained from service provider (directly provided by a content server).

Based on the previous description, the simplest way to deploy the information collector 100 is by setting up dedicated/centralized server(s) (deployed, managed and maintained by the service provider or administrator) and running the information collector 100 on it (them). It can also be implemented as a module and run on some streaming content servers.

Although setting up dedicated/centralized servers is a simple and much preferred way to implement the information collector, it is still possible to realize the information collector module without the help of dedicated/centralized server(s). We illustrate one example, some of the peers (with long online duration, more powerful CPU, etc) can be selected as Super Nodes, which can run the information collector module parallel to the original VoD streaming module. Peers can learn new peers or neighbors either by Super nodes or through gossip-based mechanism.

2. The peers 200-1, 200-2, ..., 200-i ... 200-n

It is worth noting that throughout this document, "peer" is used as a generalized term, which represents all types of nodes in an overlay networks that the system 1000 are focusing on, including client peers in P2P-assisted VoD systems, set-top boxes (STBs) in the IPTV systems and so on.

Figure 3:
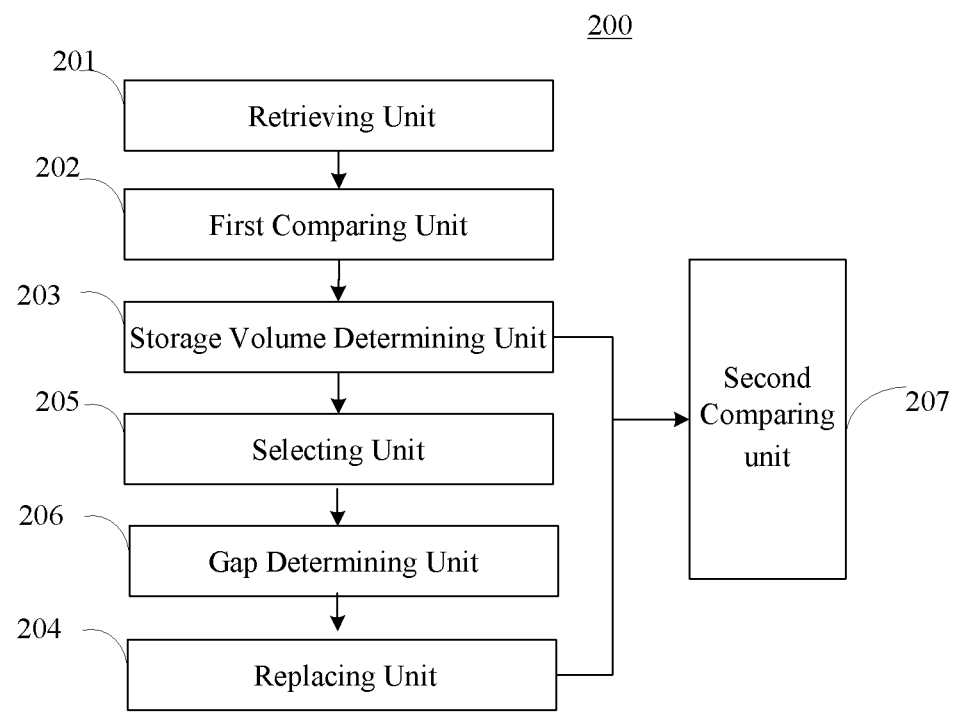
FIG. 3 shows a block diagram of a peer according to one embodiment of the application.

FIG. 3 shows a block diagram of the peer according to one embodiment of the application. As shown in FIG. 3, the peer comprises a retrieving unit 201, a first comparing unit 202, a storage volume determining unit 203 and a replacing unit 204.

$ASR_j$ and $PBR_j$ as mentioned in the above are retrieved by the retrieving unit 201. The first comparing unit 202 is configured to determine whether the $ASR_j$ is not larger than $PBR_j$. The storage volume determining unit 203 then operates to determine whether the peer i has enough storage for storing the candidate media unit j if $ASR_j$ is not lager than $PBR_j$. The replacing unit 204 is configured to store the candidate media unit j in the peer i if the peer i has enough storage for storing the candidate media unit.

According to one embodiment, the peer may further comprise: a selecting unit 205 configured to select a media unit r with the highest priority to be replaced from a local stored media unit set $Q_i$ in peer i; a relative bandwidth gap determining unit 206 configured to determine an expected bandwidth gap before replacement $gap^b$, and an expected bandwidth gap after the replacement $gap^a$ for the candidate media unit j, respectively; and a second comparing unit 207 configured to determine whether a value of $gap^b$ is larger than a value of $gap^a$; if yes, the replacing unit 204 operates to remove the selected media unit r from said local stored media unit set $Q_i$, and add said candidate media unit j into said local stored media unit set $Q_i$.

Hereinafter, a process for a content replication according to one embodiment of the application will be discussed in reference to FIG. 4. The steps discussed below may be carried out by the information collector 100 or one or more peers as stated in the above. Through the following description, those skilled in the art should further understand how the above mentioned parameters are determined.

Figure 4:
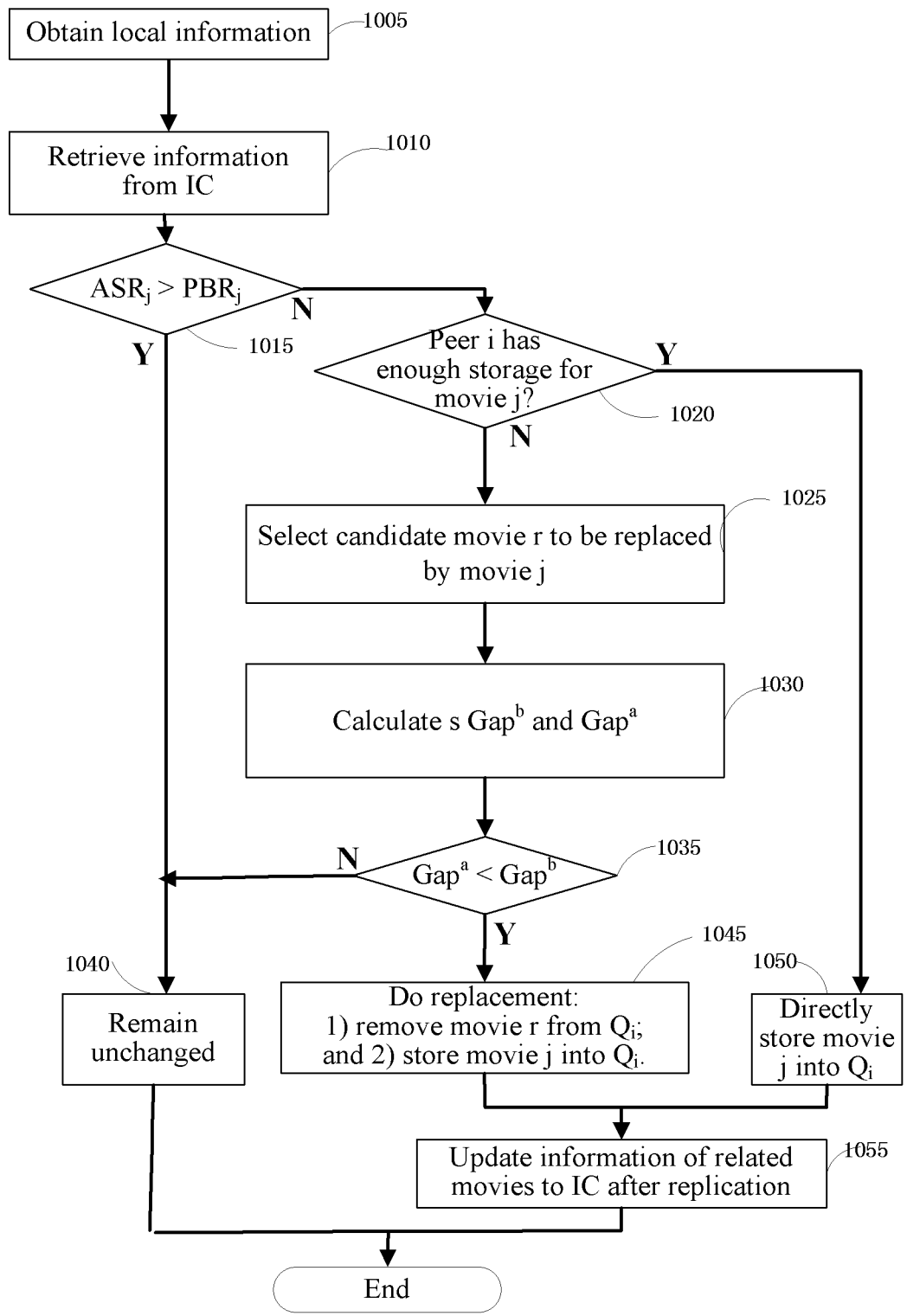
FIG. 4 illustrates a block diagram of the content replication method according to one embodiment of the application.

As shown in FIG. 4, the process 4000 begins at step S1005, in which local information in a peer, for example peer i, is obtained by the peer i. In one embodiment, the local information may be obtained through the above mentioned retrieving unit 201, and may comprise:

a) local storage information of the peer i, including size of remaining vacant space, stored media set $Q_i$, (media ID, media size, etc);

b) $U_i$, upload capacity of the peer i; and c) information of the candidate media unit j.

As mentioned in the above, the media unit may be of a movie. Hereinafter, for purpose of the description, the term "movie" is used to replace the media unit.

At step S1010, useful information is retrieved from (for example) the information collector 100. The useful information may be also retrieved by the retrieving unit 201 according to one embodiment of the application. According to the local information obtained in step S1005, it is necessary to retrieve useful information of the related movies, i.e. movie j and all the movies in set $Q_i$. In one embodiment, the useful information may contain: a required movie playback rate (PBR), an expected aggregate service rate (ASR), a movie request rate/ movie popularity ($\eta$), and a total number of peers in the system (N).

Note that the derivation for PBR and ASR of related movies will be described in detail later.

At step S1015, the first comparing unit 202 operates to determine whether the $ASR_j$ is not lager than $PBR_j$. If $ASR_j > PBR_j$, which means the expected aggregated service rate (upload bandwidth) of movie j provided by the peers is larger than movie j's required playback rate, then there is no need to increase the replication copy of movie j. In this case, everything remains unchanged (as shown in step S1040) and the process ends. Otherwise, it is necessary to make more replication copy of movie j among peers (movie j becomes the replicating candidate for peer i). However, whether the movie j should be stored into peer i's local storage (or, has higher priority than the existing movies in set $Q_i$) needs more calculation and investigation.

At step S1020, based on the local storage information of peer i, a storage volume determining unit 203 operates to determine whether there is adequate storage space to store the movie j. If the available storage size in the peer i is large enough, then directly store the copy of movie j and no existing movies in set Q, needs to be removed, as is shown in step S1050. And then, the peer i should inform the updating module 106 of the information collector 100 to update peer i's latest local storage information to the information collector 100 (step S1055) so that the information collector 100 could help other peers when they run this process 4000 later and separately.

Otherwise, further analysis needs to be made to see whether it is necessary to replace the existing movie in set $Q_i$ with movie j.

Specifically, at step S1025, the selecting unit 205, based on the retrieved movie information of local stored movies in set $Q_i$, selects a movie r from $Q_i$ which has the highest priority among all the movies in set $Q_i$ to be removed, i.e., the candidate movie to be replaced by movie j (1025). In this step, we propose a metric called weighted redundant service rate. For example, if the movie r has the largest value of such metric among all the movies in set $Q_i$, i.e., $r = \arg\max_{k \in Q_i} \eta_k(ASR_k - PBR_k)$, we consider it as the candidate movie to be replaced.

At step S1030, two key metrics, called relative expected bandwidth gap (or, server burden), $Gap^b$ (b stands for before, means with no replacement) and $Gap^a$ (a stands for after, means after doing the replacement) are calculated, for example, by elative bandwidth gap determining unit 206 by rule of:

$$Gap^b = \Sigma_{k \in Q_i} \eta_k (PBR_k - ASR_k)^+ + \eta_j (PBR_j - ASR_j)^+,$$

$$Gap^a = \Sigma_{k \in Q_i} \eta_k (PBR_k - ASR_k^a)^+ + \eta_j (PBR_j - ASR_j^a)^+,$$
where $(x)^+ = \max\{x, 0\}$.

The intuition behind this formula is that $Gap^b$ represents the expected total server burden caused by the viewing behaviors of peers who are watching movie j and all the movies in set $Q_i$ when movie r is not replaced by movie j (before replacement). $Gap^a$ has the similar meaning when movie r is replaced by movie j (after replacement). How to determine $Gap^b$ and $Gap^a$ will be further discussed latter.

At step S1035, it is determined whether the movie r should be replaced by movie j. For example, a second comparing unit 207 may be utilized to determine whether $Gap^a < Gap^b$. If $Gap^a < Gap^b$, which implies that the replacement will help to decrease expected server burden, then the replacement may be carried out at step S1045; otherwise, the movie r should not be replaced and $Q_i$ remains unchanged (step S1040). Specifically, at the step S1045, the movie r will be removed from set $Q_i$ and the copy of movie j will be stored locally by adding the movie j into the set $Q_i$ through the replacing unit 204.

Finally, at step S1055, the updating unit 106 will update the information. As long as the local stored movie set $Q_i$ has been changed (either new movies added or existing movie replaced by other movies), peer i should update its latest local storage information to the information collector 100 so that the information collector 100 could help other peers when they run this process later and separately.

Hereinafter, the more details for steps S1025-S1055 will be discussed in reference to the following pseudo code.

```
1:   r = arg max_{k∈Q_i} η_k(ASR_k − PBR_k);
2:   λ_i = N Σ_{k∈Q_i} η_k;
3:   λ_i^a = λ_i + (η_j − η_r)N;
4:   for all k such that k ∈ Q_i and k ≠ r do
5:       ASR_k^a = ASR_k − U_i/λ_i + U_i/λ_i^a;
6:   end for
7:   ASR_r^a = ASR_r − U_i/λ_i;
8:   ASR_j^a = ASR_j + U_i/λ_i^a;
9:   Gap^b = Σ_{k∈Q_i} η_k(PBR_k − ASR_k)^+ + η_j(PBR_j − ASR_j)^+;
10:  Gap^a = Σ_{k∈Q_i} η_k(PBR_k − ASR_k^a)^+ + η_j(PBR_j − ASR_j^a)^+;
11:  if Gap^a < Gap^b then
12:      replace movie r with movie j
13:      delete r from Q_i and add j into Q_i
14:  end if
```

As is explained in step S1025, Line 1 is the code to select candidate movie r from set $Q_i$ to be replaced in highest priority.

Line 2 to Line 8 are codes of calculating the expected aggregate service rate ASR contributed by peers. Peer i can help another peer (watching movie k) only if peer i has replicated movie k in its local storage, i.e. $k \in Q_i$. $\eta_k$, the movie request rate/popularity of movie k can be approximated as the probability that, among all the possible choices, a peer selects movie k to watch. Hence, the number of peers that peer i can help follows a binomial distribution with parameter $p_i = \Sigma_{k \in Q_i} \eta_k$, and the expectation of such number can be easily derived by Poison approximation, $\lambda_i \approx N p_i = N \Sigma_{k \in Q_i} \eta_k$, where N is the total number of peers in the system (Line 2). In Line 3, the calculation of $\lambda_i$ and $\lambda_i^a$ are similar:

$\lambda_i = N^* \Sigma_{k \in Qi} \eta k$, before replacement, movie r is still in the set Qi, but movie j is not.

$\lambda_i^a = N^* \Sigma_{k \in Qi} \eta k$, after replacement, movie r is no longer in the set Qi.

Therefore, mathematically, the relationship between $\lambda_i$ and $\lambda_i^a$ is just what Line 3 expresses:

$$\lambda_i^a = N^*(\Sigma_{k \in Qi} \eta_k - \eta_r + \eta_j) = N^* \Sigma_{k \in Qi} \eta_k - N\eta_r + N\eta_j = \lambda_i - N\eta_r + N\eta_j]$$

In the current stage, it is reasonable to make the assumption that each peer will equally share its service rate among all the peers that it can help. In real implementation, this assumption can be easily realized by deploying Round-Robin strategy at each peer when it is helping other peers. So, the expected aggregate service rate for movie k can be derived: $ASR_k = \Sigma_{i \in Sk}(U_i/\lambda_{i})$, where $S_k$ is the set of peers which have replicated movie k in their local storage and $U_i$ is the upload capacity of peer i. Since calculating $ASR_k$ needs information (U and $\lambda$) of other peers (peers in set $S_k$), which is not locally available for peer i, $ASR_k$ should be retrieved from the information collector 100, as stated in step s1010.

After $ASR_k$ is obtained, the remaining parameters can be derived with some simple calculation. For example, in Line 5, $ASR_k^a$ is derived by substituting $U_i/\lambda_i$ with $U_i/\lambda_i^a$ in $ASR_k$. Since Line 5 is in a loop (from Line 4 to Line 6), all the $ASR_k^a$, k∈$Q_i$ is adjusted except for the movie r. The movies r and j are special, so their ASR should be obtained separately. In Line 7, $ASR_r^a$ is set to be the result of $ASR_r$ minus $U_i/\lambda_i$ because the movie r no longer belongs to the set $Q_i$ a after replacement. In the same way, $ASR_j^a$ is updated by adding $U_i/\lambda_i^a$ to $ASR_j$ (Line 8).

Line 9 and Line 10 have been discussed in step 1030. The discussions thereto are directly focused on the key points of these two codes. Since $PBR_k$ is the minimum required download rate for watching movie k, if $ASR_k < PBR_k$, which means that the aggregate service rate contributed by the peers is still not sufficient, then in order to maintain peers' viewing quality, the content server must provide additional upload bandwidth to support for supporting movie k. On the other hand, if $ASR_k > PBR_k$, then ideally, server does not need to provide bandwidth for supporting movie k. Therefore, $(PBR_k - ASR_k)^+$ includes both of the above two cases in one formula.

Line 11 refers to step S1035, and Lines 12 and 13 refer to step S1045. As have been discussed in the above, the description thereof is omitted.

Although throughout this description, term "movie" or "media unit" is used as the minimum logical unit for replacement and replication, in real implementation, the minimum logical unit can be in smaller size, i.e. block/chunk based. Usually a movie can be composed of tens to hundreds of chunks (depending on the size of chunk used). The embodiments of the present application may adapt to such smaller logical unit without any difficulty.

Features, integers, characteristics, compounds, compositions, or combinations described in conjunction with a particular aspect, embodiment, implementation or example disclosed herein are to be understood to be applicable to any other aspect, embodiment, implementation or example described herein unless incompatible therewith. All of the features disclosed in this application (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments and extends to any novel one, or any novel combination, of the features disclosed in this specification (including any accompanying claims, abstract and drawings), or to any novel one, or any novel combination, of the steps of any method or process so disclosed.

The invention claimed is:

1. A method for replicating media contents in a P2P VoD system comprising a plurality of peers, comprising:
    determining that a candidate media unit shall be replicated into a local storage of one of the peers;
    checking whether said local storage has enough space to store the candidate media unit;
    if not, selecting one media unit previously stored in said local storage to be replaced; and
    replacing the selected media unit by the candidate media unit;
    wherein the selecting further comprises:
    selecting a media unit with a highest priority to be replaced from said one of the peers; and
        wherein the media unit r with the highest priority is determined by $r = \arg \max_{k \in Qi} \eta_k(ASR_k - PBR_k)$,
    where arg means the one in $Q_i$ that has the maximum value of $\eta_k(ASR_k - PBR_k)$; and $ASR_k = \Sigma_{i \in Sk} U_i/\lambda_i$,
    where $S_k$ is a set of peers from the plurality of peers, each of which has a replication for media unit k in its local storage,
    $U_i$ is an upload capacity for a peer i in $S_k$, and
    $\lambda_i$ is a Poison approximation for a number of peers who requests the media unit k from the peer i, and
    $PBR_k$ means a required playback rate for the media unit k, and
    $\eta_k$ represents a request rate/popularity for the media unit k.

2. A method of claim 1, wherein, if said local storage has enough space to store the candidate media unit upon the checking, the method further comprises:
    storing directly the candidate media unit into said local storage.

3. A method of claim 1, wherein the candidate media unit is determined depending on the peers' viewing behaviors.

4. A method of claim 1, wherein the candidate media unit is assigned by a service provider or a service administrator.

5. A method of claim 1, wherein the determining further comprises:
    determining an expected aggregate service rate $ASR_j$ of the candidate media unit;
    determining a required playback rate of the candidate media unit;
    checking whether the expected aggregate service rate is not larger than the required playback rate; and
    if yes, determining that the candidate media unit shall be replicated into the local storage.

6. A method of claim 1, wherein $\eta_k$ is assigned by applying historical data in the P2P VoD system.

7. A method of claim 1, wherein $\eta_k$ is determined by applying a prediction result on historical data in the P2P VoD system.

8. A method of claim 1, wherein $\eta_k$ is assigned by a service provider or a service administrator.

9. A method of claim 1, wherein the replacing further comprises:
    determining an expected bandwidth gap before replacement, and an expected bandwidth gap after replacement, respectively;
    determining a value of the expected bandwidth gap after the replacement is less than a value of the expected bandwidth gap before replacement; and replacing the selected media unit by said candidate media unit.

10. A method of claim 1, wherein the media unit comprises a movie.

11. A method of claim 1, wherein each of the peers comprises a client peer in P2P-assisted VoD systems or a set-top box in an IPTV system.

12. A method of claim 1, wherein the P2P VoD system further comprises an information collector communicating with each of the peers, and
   wherein the determining is carried out by the information collector, and the checking, selecting, and replacing are carried out by at least one of the peers.

13. A method of claim 5, wherein the required playback rate is predetermined and media dependant.

14. A method of claim 5, wherein the expected aggregate service rate $ASR_j$ of the candidate media unit is provided by the peers.

15. A method of claim 9, wherein the expected bandwidth gap before replacement, and the expected bandwidth gap after replacement are determined from:

$$Gap^b = \Sigma_{k \in Qi} \eta_k (PBR_k - ASR_k)^+ + \eta_j (PBR_j - ASR_j)^+, \text{ and}$$

$$Gap^a = \Sigma_{k \in Qi} \eta_k (PBR_k - ASR_k^a)^+ + \eta_j (PBR_j - ASR_j^a)^+,$$

where,
$(x)^+ = \text{Max}\{x, 0\}$;
$Gap^b$ represents the expected bandwidth gap before replacement;
$Gap^a$ represents the expected bandwidth gap after replacement;
$\eta_j$ represents a request rate/popularity for said candidate media unit j;
$PBR_j$ represents a required playback rate of the candidate media unit j;
$ASR_j$ represents an expected aggregate service rate for said candidate media unit j;
$\eta_{k,\ k \in Qi}$ represents a request rate/popularity for the media unit k, and the media unit k belongs to the movie set $Q_i$ including all media units stored in peer i's local storage;
$\eta_j$ represents a request rate/popularity for the candidate media unit j;
$ASR_k^a$ represents an expected aggregate service rate after replacement for the media unit k;
$ASR_j^a$ represents the expected bandwidth gap after replacement for said candidate media unit j.

16. A method of claim 9, wherein the replacing further comprises:
   removing the selected media unit from said local stored media unit set; and
   adding said candidate media unit into said local stored media unit set.

17. A method of claim 12, wherein the information collector maintains information for at least one of the peers to carry out the checking, selecting, and replacing.

18. A method of claim 17, further comprising:
   updating the information maintained in the information collector upon the replacing.

19. A P2P VoD system, comprising:
   a plurality of peers; and
   an information collector communicating with each of the peers and configured to determine that a candidate media unit shall be replicated into a local storage of one of the peers;
   wherein said one of the peers operates to check whether said local storage has enough space to store the determined candidate media unit; if not, further to select one media unit previously stored in said local storage, and replace the selected media unit by the determined candidate media unit;
   wherein, if said one of the peers determines said local storage has not enough space to store the determined candidate media unit, it selects one media unit with a highest priority previously stored in its local storage and replaces the selected media unit by the determined candidate media unit; and
   wherein the media unit r with the highest priority is determined by $r = \arg \max_{k \in Qi} \eta_k (ASR_k - PBR_k)$,
   where arg means the one in $Q_i$ that has the maximum value of $\eta_k(ASR_k - PBR_k)$; and $ASR_k = \Sigma_{i \in Sk} U_i / \lambda_i$,
   where $S_k$ is a set of peers from the plurality of peers, each of which has a replication for media unit k in its local storage,
   $U_i$ is an upload capacity for a peer i in the set of peer $S_k$, and
   $\lambda_i$ is a Poison approximation for a number of peers who requests the media unit k from the peer i, and
   $PBR_k$ means a required playback rate for the media unit k, and
   $\eta_k$ resents a request rate/popularity for said media unit k.

20. A system of claim 19, wherein, if said local storage has enough space to store the determined candidate media unit upon the checking, said one of the peers operates to store directly the candidate media unit into said local storage.

21. A system of claim 19, wherein the information collector further comprises:
   a candidate media determining module configured to determine or receive the candidate media unit.

22. A system of claim 19, wherein the information collector further comprises:
   a maintaining module configured to maintain information for a media unit set locally stored in each of the peers.

23. A system of claim 19, wherein $\eta_k$ is assigned by applying historical data in the P2P VoD system.

24. A system of claim 19, wherein $\eta_k$ is determined by applying a prediction result on historical data in the P2P VoD system.

25. A system of claim 19, wherein $\eta_k$ is assigned by a service provider or a service administrator.

26. A system of claim 19, wherein one of the peers replaces the selected media unit by the determined candidate media unit by following steps:
   determining an expected bandwidth gap before replacement, and an expected bandwidth gap after replacement, respectively;
   determining a value of the expected bandwidth gap after the replacement is less than a value of the expected bandwidth gap before replacement; and
   replacing the selected media unit by said candidate media unit.

27. A system of claim 19, wherein the media unit comprises a movie.

28. A system of claim 19, wherein each of the peers comprises a client peer in P2P-assisted VoD systems or a set-top box in an IPTV system.

29. A system of claim 21, wherein the candidate media unit is determined depending on the peers' viewing behaviors.

30. A system of claim 21, wherein the candidate media unit is assigned by a service provider or a service administrator.

31. A system of claim 22, wherein the maintaining module further maintains an expected aggregate service rate ASR j for the candidate media unit, and a required playback rate for the candidate media unit.

32. A system of claim 22, wherein the information maintained in the maintaining module comprises at least one of:

a total number of the peers,
a local stored media unit set for each of the peers,
an access rate/popularity for each media unit from the local stored media unit set,
an expected aggregate service rate for said each media unit, and
a required playback rate for said each media unit.

33. A system of claim 32, wherein the required playback rate is predetermined and media dependant.

34. A system of claim 32, wherein, one of the peers operates to check whether the expected aggregate service rate for the candidate media unit is not larger than the required playback rate for the candidate media unit; if yes, said one of the peers determine that the candidate media unit shall be replicated into said local storage of said one of the peers.

35. A system of claim 34, wherein the expected aggregate service rate $ASR_j$ of the candidate media unit is provided by the peers.

36. A system of claim 26, wherein the expected bandwidth gap before replacement, and the expected bandwidth gap after replacement are determined from:

$Gap^b = \Sigma_{k \in Q_i} \eta_k (PBR_k - ASR_k)^+ + \eta_j (PBR_j - ASR_j)^+$, and $Gap^a = \Sigma_{k \in Q_i} \eta_k (PBR_k - ASR_k^a)^+ + \eta_j (PBR_j - ASR_j^a)^+$, where, $(x)^+ = Max\{x, 0\}$;

$Gap^b$ represents the expected bandwidth gap before replacement;

$Gap^a$ represents the expected bandwidth gap after replacement;

$\eta_j$ represents a request rate/popularity for said candidate media unit j;

$PBR_j$ represents a required playback rate of the candidate media unit j;

$ASR_j$ represents an expected aggregate service rate for said candidate media unit j;

$\eta_{k, k \in Q_i}$ represents a request rate/popularity for the media unit k, and the media unit k belongs to the movie set $Q_i$ including all media units stored in peer i's local storage;

$\eta_j$ represents a request rate/popularity for the candidate media unit;

$ASR_k^a$ represents an expected aggregate service rate after replacement for the media unit k;

$ASR_j^a$ represents the expected bandwidth gap after replacement for said candidate media unit j.

* * * * *